United States Patent [19]

Scott

[11] Patent Number: 4,529,067

[45] Date of Patent: Jul. 16, 1985

[54] MULTIPLE DISC BRAKE

[75] Inventor: James P. Scott, Fort Wayne, Ind.

[73] Assignee: Rockwell International Corporation, Pittsburgh, Pa.

[21] Appl. No.: 528,325

[22] Filed: Aug. 31, 1983

[51] Int. Cl.³ .................... F16D 55/224; F16D 55/38
[52] U.S. Cl. ................................ 188/18 A; 188/71.5; 188/72.8; 188/73.34; 188/73.45
[58] Field of Search .................. 188/18 A, 71.5, 71.9, 188/72.8, 72.9, 73.31, 73.34, 73.45, 370

[56] References Cited

U.S. PATENT DOCUMENTS

| | | | |
|---|---|---|---|
| 2,934,174 | 4/1960 | Lucien | 188/71.5 |
| 3,237,724 | 3/1966 | Kershner et al. | 188/71.5 |
| 3,295,647 | 1/1967 | Murphy | 188/71.5 |
| 3,707,207 | 12/1972 | Kondo | 188/71.5 |
| 4,352,414 | 10/1982 | Scott | 188/73.34 |
| 4,406,352 | 9/1983 | Scott et al. | 188/72.8 |

FOREIGN PATENT DOCUMENTS

| | | | |
|---|---|---|---|
| 2558581 | 7/1977 | Fed. Rep. of Germany | 188/72.8 |
| 57-12135 | 1/1982 | Japan | 188/71.5 |
| 2049845 | 12/1980 | United Kingdom | 188/73.45 |
| 2088498 | 6/1982 | United Kingdom | 188/73.34 |

Primary Examiner—Douglas C. Butler
Assistant Examiner—Richard R. Diefendorf

[57] ABSTRACT

A dual rotor disc brake utilizing spot or segment type friction pads. The rotors and friction pads are axially movable for contact by adjacent ones thereof and major portions of the rotors rotate free of contact with the friction pads.

3 Claims, 7 Drawing Figures

MULTIPLE DISC BRAKE

BACKGROUND OF THE INVENTION

1. Field of the Invention

The present invention relates to a disc brake and more specifically to an improved dual rotor disc brake utilizing spot or segment type friction pads.

Spot or segment friction pads are utilized in disc brakes to provide friction means adjacent oppositely disposed surfaces of a rotor at a predetermined spot or segment of the rotor thereby permitting a substantial portion of the rotor which is not located between the friction pads to rotate through and be exposed to ambient air in the vicinity of the vehicle wheel to dissipate thermal energy resulting from the pressurized contact of the friction pads with the rotor. Such an arrangement provides an efficient air cooled brake for use on automotive vehicles since actuation is required only in the area of the spot or segment type friction pads and the rotor may be continually cooled during use by ambient air adjacent the wheel. As used herein, "friction pad" and "friction pad means" shall mean a rigid, usually metal, backing plate having friction lining material secured to one or both surfaces thereof with the circumferentially spaced lateral edges of the friction lining material contained within a 90° segment of the rotor to be engaged by the friction pad.

2. Description of the Prior Art

Disc brakes have been known and used with considerable success on automotive vehicles for over the highway use as well as off highway use. Disc brakes utilized in over the highway type vehicles have usually employed a single rotor and a pair of friction pads disposed opposite radially extending surfaces of the rotor and moved into frictional contact with the rotor by fixed or floating actuating means. One such disc brake is disclosed in U.S. Pat. Nos. 4,352,414 and 4,406,352. Off highway vehicles and some aircraft disc brakes have utilzed a plurality of axially movable rotors fixed for rotation with the vehicle wheel and annular type friction rings located between adjacent rotors and secured against rotation to effect a full 360° surface contact between the friction rings and the rotors when the brake is actuated. These vehicles and service requirements are such that the full 360° friction contact between the friction discs and the rotors is generally satisfactory although there have been many efforts to provide means for dissipating thermal energy generated during braking. Some of these have involved the use of cooling fluid where the discs and rotors rotate through a bath of oil. Other systems have utilized pumps for moving liquid coolant into the region of the friction discs and rotors to absorb the thermal energy during actuation of the brake. The space available in the vicinity of an over the road type vehicle wheel and the industry and service requirements for such a vehicle brake are such as to mitigate against the use of a multiple rotor disc brake utilizing a full 360° of surface contact between the rotors and discs.

SUMMARY OF THE INVENTION

The present invention provides an improved dual rotor disk brake for automotive type vehicles which utilizes spot or segment type friction pads and thereby maintains the efficiency of requiring actuating means only in the area of the friction pads increasing braking torque through the use of two rotors with a single actuation and providing a substantial area of the rotors which are not located between the spot or segment type friction pads and therefore dissipate thermal energy as they rotate freely through ambient air in the vicinity of the wheel.

The present invention provides a brake for a vehicle wheel mounted for rotation on an axle comprising a pair of axially aligned rotors mounted for rotation with the wheel, each of the rotors having a first radially extending surface axially spaced from a first radially extending surface of the other rotor, a support fixed to the axle, and actuating means carried by the support and including axially movable force transmitting means disposed adjacent a second radially extending surface of one of the rotors. A first axially movable friction pad is disposed between the force transmitting means and the second radially extending surface of the one rotor. A second axially movable friction pad is disposed adjacent a second radially extending surface of the other rotor. A third axially movable friction pad is disposed between the first radially extending surfaces of both rotors. The first, second and third friction pads are mounted substantially in axial alignment with means preventing rotation of the friction pads. An abutment limits axial movement of the second friction pad away from the adjacent rotor, and actuation of the actuating means moves the first, second and third friction pads and both rotors axially until the second friction pad contacts the abutment and the third friction pad is pressed between the first radially extending surfaces of both rotors.

In the preferred embodiment the actuating means are supported by a housing mounted for axial movement relative to the support with the housing extending over the radially outer periphery of both rotors and having a leg extending radially inward adjacent a second radially extending surface of the other rotor and reaction abutment means are provided between the actuating means and the housing. In this embodiment, the housing leg serves as an abutment limiting axial movement of the second friction pad and, during actuation of the brake, as the first friction pad is moved into contact with one rotor, the reaction abutment means moves the housing and the radially extending leg which moves the second friction pad into contact with the other rotor and the first and second friction pads move at least one of the rotors to effect friction contact between both of the rotors and the third friction pad.

In the preferred embodiment both rotors are annular in form and are axially movable along a plurality of ways and grooves provided between the rotor and an axially extending cylindrical section of an annular adapter secured to the wheel.

In the preferred embodiment, a substantially rectangular opening is provided through the housing radially outward from the rotors and the three friction pads are non-rotatably and slidably supported by two circumferentially spaced axially extending edges of the rectangular opening.

The advantages offered by the present invention will become apparent from the following description of the embodiment shown in the accompanying drawings.

DESCRIPTION OF THE DRAWINGS

In the drawings, wherein like reference numerals refer to like parts.

DESCRIPTION OF THE INVENTION

Figure 1:
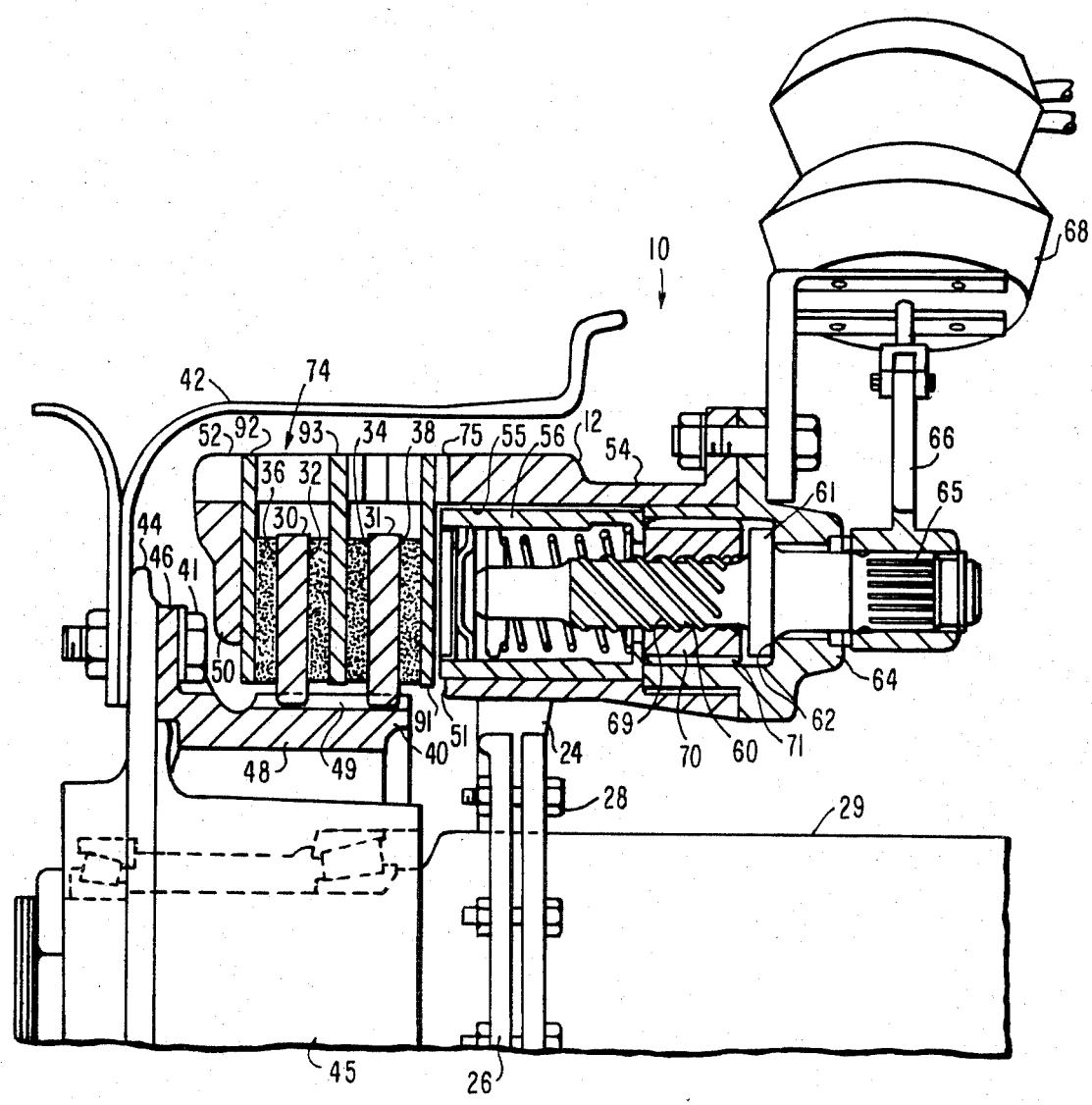
FIG. 1 is a front elevation partly in section of a disc brake incorporating the present invention.
Figure 2:
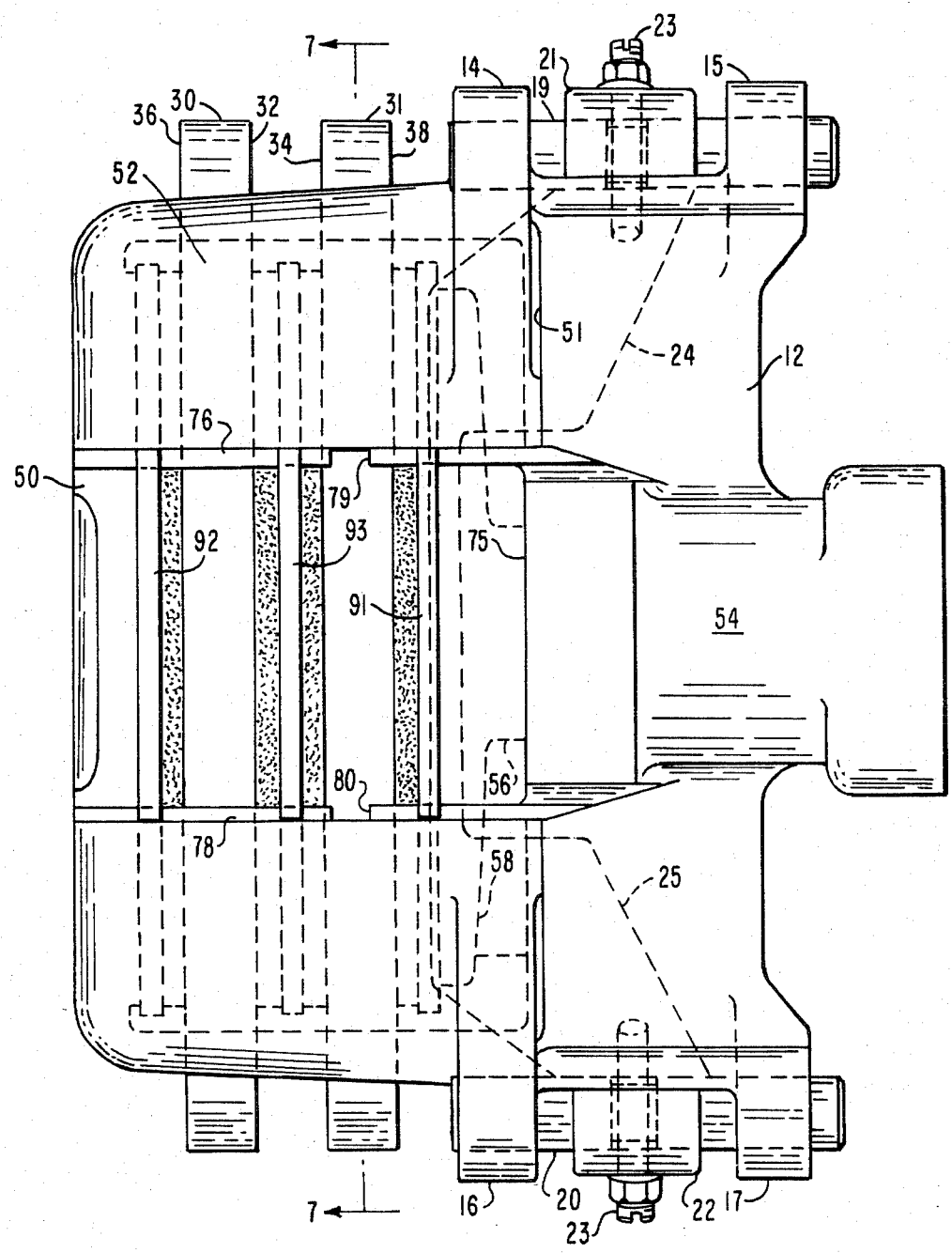
FIG. 2 is a plan view of the disc brake housing and supporting elements of the disc brake assembly of FIG. 1.

With reference to the drawings, FIGS. 1 and 2 show a disc brake assembly generally designated by the numeral 10. The assembly 10 includes a floating caliper 12 mounted by means of circumferentially spaced, axially aligned pairs of bosses 14 and 15, and 16 and 17, on slide pins 19 and 20. The slide pins 19 and 20 are respectively secured by draw pins 23 within bores provided to bosses 21, 22 at the radially outer extremities of circumferentially spaced, radially extending arms 24, 25 of the brake supporting torque plate or spider 26. The torque plate 26 is provided with a circular array of apertures which receive a plurality of bolts 28 which in turn secure the support or torque plate 26 to a flange welded to a vehicle axle 29.

A pair of rotors 30, 31 having first axially spaced radially extending oppositely disposed friction braking surfaces 32 and 34 are axially slidably mounted to an adapter 40 secured by means of a plurality of bolts 41 to a flange 44 of a wheel hub rotatably mounted in conventional manner by bearings provided at the end of the vehicle axle 29. The radially inward extending flange of wheel 42 is also secured to the hub flange 44 by bolts 41.

Figure 3:
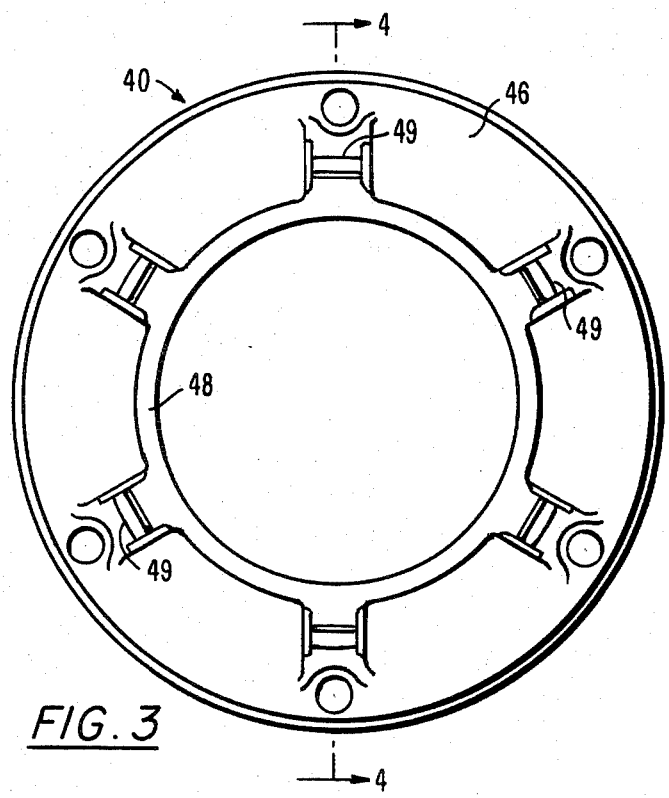
FIG. 3 is a side elevation of the rotor adaptor shown in the disc brake assembly of FIG. 1.
Figure 4:
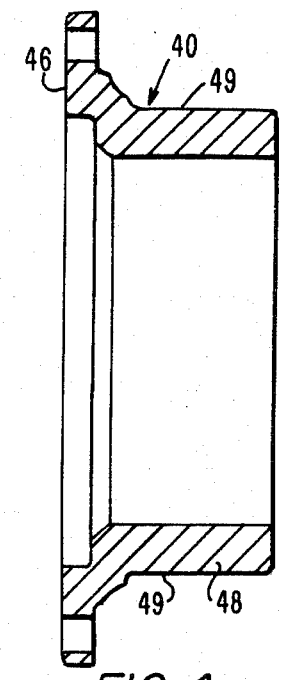
FIG. 4 is a sectional view taken along the line 4—4 of FIG. 3.

The adapter 40 as best shown in FIGS. 3 and 4 has a radially extending mounting flange 46 and an axially extending cylindrical portion 48. Six axially extending ways 49 are evenly spaced around the circumference of the axially extending cylindrical portion 48.

Figure 5:
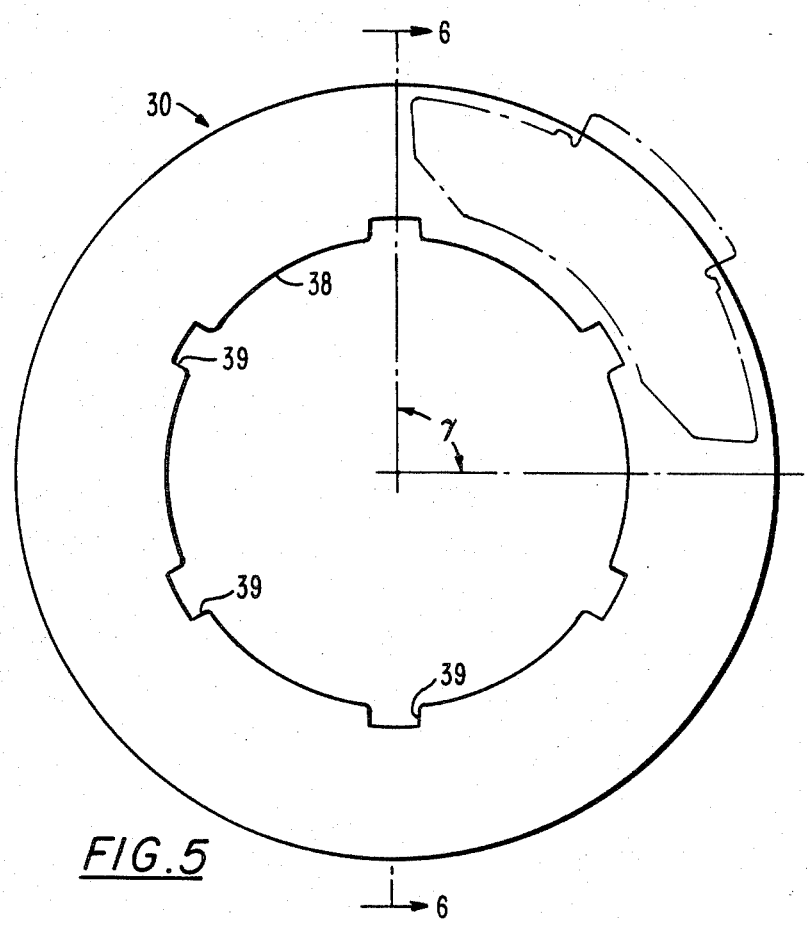
FIG. 5 is a side elevation of a rotor of the disc brake assembly of FIG. 1.
Figure 6:
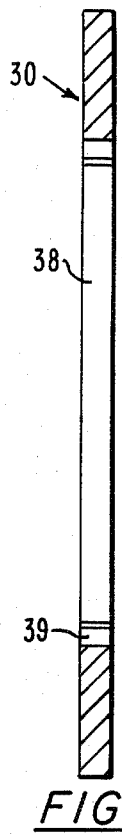
FIG. 6 is a sectional view taken along the line 6—6 of FIG. 5.

Rotors 30, 31 both of which are identical in structure and one of which is shown in FIGS. 5 and 6 are also annular or ring like in form having an inner periphery 38 and six radially outwardly directed grooves 39. The grooves 39 are evenly spaced about the inner periphery 38 of each rotor and are dimensioned to provide an axially sliding fit with the ways 49 provided to the adaptor 40. The rotor grooves 39 and the adaptor ways 49 thus provide a spline type mounting between the rotors 30, 31 and the adapter 40 which provide a rotary driving connection between the rotors and the adapter while permitting axial movement of each rotor relative to the axially extending cylindrical portion 48 of the adapter 40.

The outline of a friction pad is also shown by phantom lines in FIG. 5 to illustrate the general location and size of a friction pad relative to the rotor and that the outline and lateral edges of a spot or segment type friction pad of the present invention are contained within a 90° segement of the rotor 30 as represented by the angle α.

The caliper 12 is a cast metal component comprised of a depending leg 50 extending radially inward adjacent a second friction surface 36 of the rotor 30, an oppositely disposed depending leg or surface 51 adjacent a second radially extending friction surface 38 of rotor 31 and a bridge 52 extending over the radially outer periphery of the rotors 30, 31 and joining the leg 50 to the surface 51. The caliper 12 is formed with a generally cylindrical housing 54 extending to the right of the wall 51 as shown in FIG. 2. The housing 54 is provided with a cylindrical bore 55 slidably mounting a piston 56 formed integrally with a load plate 58.

The piston 56 and load plate 58 may be moved in the direction of the rotors 30, 31 by suitable hydraulic or mechanical actuating means.

As shown by FIG. 1, a powerscrew actuating means is utilized in the preferred embodiment. A powerscrew 60 having an integrally formed radially extending flange 61 seated against a radially extending surface 62 of a cap 64 bolted to the caliper 12 is utilized to move the piston 56 axially in the bore 55. Powerscrew 60 is splined at one end 65 for connection to an actuating lever 66 connected by means of a clevis to the push rod of an air motor 68. The powerscrew is provided with a multiple lead thread 69 which engages corresponding threads provided internally of a nut 70. A plurality of splines 71 provided around the exterior of the nut 70 engages a plurality of corresponding splines provided interiorly of the caliper housing 12 which permit axial movement of the nut 70 while preventing rotation of the nut within the cylindrical housing 54.

The bridge 52 of caliper 12 is provided with an aperture 74 defined by a radially disposed edge 75, a pair of circumferentially spaced, axially extending, radially converging edges 76 and 78, and the radially inwardly extending caliper leg 50. The circumferentially spaced edges 76, 78 converge in a radial direction at an included angle of about 32°. The circumferentially spaced edges 76, 78 are each provided with a slot 79, 80. The bottoms 81, 82 of the slots 79, 80 are substantially parallel and the slots 79, 80 are located radially outward from the periphery of the rotor 31 so as to extend at least partly across the periphery of the rotor 31 as shown in FIG. 2.

A friction pad comprised of a backing plate having friction lining material secured to a major surface thereof is disposed between the piston 56 and the radially extending surface 38 of the rotor 31.

A friction pad 92 comprised of a backing plate having friction lining materials secured to a major surface thereof is disposed between the caliper leg 50 and the radially extending surface 36 of the rotor 30.

A friction pad 93 comprised of a backing plate having friction lining material secured to both of the oppositely disposed major surfaces thereof is disposed between the radially extending surface 32 of rotor 30 and the radially extending surface 34 of rotor 31.

The friction pads 91, 92 and 93 are generally of the same shape and structure, the major exception being that friction pad 93 is provided with friction lining material on both major surfaces thereof whereas friction pads 91 and 92 are provided with friction lining material on the major surfaces facing the rotors 31 and 30 respectively.

Figure 7:
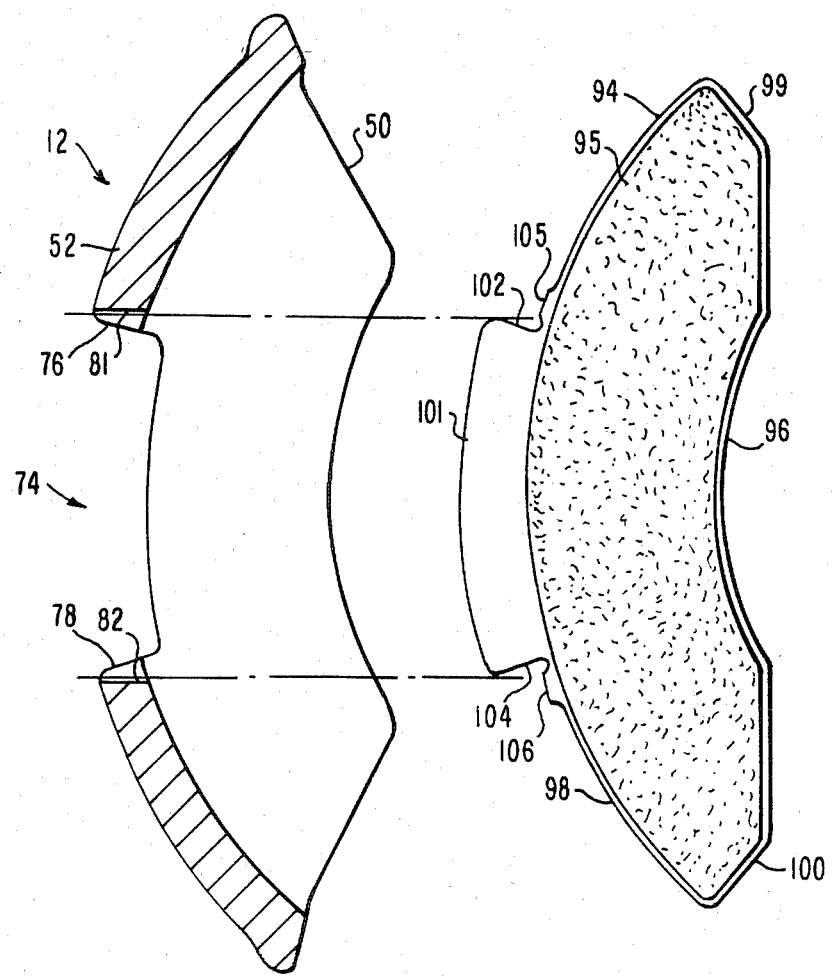
FIG. 7 is a sectional view of the disc brake caliper partly taken along the line 7—7 of FIG. 2 and one of the friction pads.

As best shown by FIG. 7, each of the friction pads 91, 92 and 93 are comprised of a metal backing plate 94 of uniform thickness having friction material 95 secured to a major surface thereof. The major surface is defined by arcuate longitudinal edges 96 and 98 joined by circumferentially spaced lateral edges 99 and 100. The arcuate edge 98 is of greater radius than the edge 96 and extends radially outward to provide a supporting tab 101 of substantial circumferential length less than the distance between the lateral edges 99, 100. The supporting tab 101 is circumferentially bounded by radially converging edges 102 and 104. The backing plates also include abutment surfaces 105, 106 adjacent the radially converging edges 102 and 104 respectively.

The friction pads 91, 92 and 93 are axially slidably supported in the caliper aperture 74 by means of the tabs 101. During assembly one of the slide pins 19, 20 is removed from its respective boss 21, 22 thereby permitting the caliper 12 to be pivoted about the other slide pin and exposing the interior of the caliper. The friction pads 91, 92 and 93 are installed and removed by aligning the friction pad backing plate tab 101 with the grooves 79 and 80 and in the case of insertion, to pass the tab 101 through the grooves 79 and 80 until the abutments 105, 106 contact the interior surface of the bridge 52 at which point the friction pad is displaced axially thereby axially slidably supporting the radially converging edges 102, 104 of the backing plate tab 101 on the circumferentially spaced radially converging edges 76, 78 of the caliper aperture 74. The radially converging edges 76, 78 of the caliper aperture 74 support the friction pads 91, 92, 93 in their previously described location relative to the rotors 30, 31 and prevent rotation of the friction pads 91, 92, 93 during actuation of the brake assembly while permitting axially slidably movement of the friction pads relative to the caliper 12.

During operation the brake assembly shown by FIG. 1 is actuated by supplying fluid pressure to the motor 68 to rotate the lever arm 66 and powerscrew 60. Spline 71 provided to nut 70 prevent rotation of the nut which is then driven by the powerscrew threads to the left to move the force transmitting piston 56 and load plate 58 axially in the direction of the rotors 30, 31.

The piston 56 moves the friction pad 91 into contact with surface 38 of rotor 31 which produces a reaction force in the powerscrew 60 which is transferred by the powerscrew flange 61 to the radially extending surface 62 of the caliper cap 64. The reaction force transmitted between the abutting surfaces of the flange 61 and cap 64 moves the caliper 12 to the right as shown in FIGS. 1 and 2 while the powerscrew 60 continues to move the piston 56 to the left. The caliper leg 50 serves as an abutment limiting axial movement of the friction pad 92 away from the rotor 30 and as a result of the reaction force realized at the radially extending abutment surface 62 of the cap 64, the caliper 12 moves the friction pad 62 into contact with the surface 36 of rotor 30 and the friction pads 91 and 92 move at least one and possibly both of the rotors 30, 31 to produce frictional contact between the surfaces 32, 34 of the rotors 30, 31 and the friction pad 93. When the actuating pressure is released from the fluid motor 68 the brake is released by means of springs provided internally of the fluid motor 68, the piston 56 and the mechanics of the low lead angle of the powerscrew threads 69.

The present invention thus provides a dual rotor disc brake utilizing friction pads which extend over less than 90% of the full circumference of the rotors thereby permitting actuation by means of a simple device located adjacent to friction pads and permitting the rotors to dissipate thermal energy as they rotate away from the pads in ambient air adjacent the vehicle wheel. The use of the two rotors and three friction pads actuated by a single power source also provides a substantial increase in the braking torque obtained by the brake assembly of the present invention that which is almost twice the braking torque obtained with a similar power source acting to engage a pair of friction pads with a single rotor.

The invention may also be embodied in other specific forms without departing from the spirit or essential characteristics thereof. For example, although it is preferred that both rotors and all three friction pads be axially movable relative to the axle, the advantages offered by the present invention would still be achieved if one of the rotors or one of the friction pads were fixed against axial movement. The actuating means would then displace the remaining ones of the two rotors and three friction pads axially in the direction of the one which is axially fixed. One may also gain the advantages of the present invention without the necessity of providing the axially movable caliper by fixing or providing abutment means to limit axial movement of the friction pad distant from the actuating means and utilizing the actuating means to move the other two friction pads and the two rotors in the direction of that friction pad.

The foregoing description is therefore going to be considered as illustrative and not descriptive, the scope of the invention being defined by the appended claims and all changes which come within the meaning and range of equivalency of the claims are therefore intended to be embraced thereby.

I claim:

1. A brake for a vehicle wheel mounted for rotation on an axle comprising:
   an annular adapter secured to the hub of said wheel, said adapter having an axially extending cylindrical section including a plurality of circumferentially spaced, axially extending ways,
   a pair of annular rotors, each rotor having a plurality of grooves receiving said ways to provide a rotary driving connection to said wheel while permitting axial movement of said rotors, each of said rotors having a first radially extending surface axially spaced from a first radially extending surface of the other said rotor and at least one of said rotors being axially movable toward the other said rotor,
   a support fixed to said axle,
   actuating means including axially movable force transmitting means disposed adjacent a second radially extending surface of one of said rotors,
   a housing supporting said actuating means and mounted for axial movement relative to said support, said housing extending over the radially outer periphery of said rotors and having a leg extending radially inward adjacent a second radially extending surface of the other one of said rotors,
   first axially movable friction pad means disposed between said force transmitting means and said second radially extending surface of said one rotor.
   second axially movable friction pad means disposed between said housing leg and said second radially extending surface of said other one rotor,
   third friction pad means disposed between said first radially extending surfaces of each of said rotors,
   said first, second and third friction pad means being substantially in axial alignment,
   means preventing rotation of said friction pad means, and
   reaction abutment means between said actuating means and said housing whereby actuation of said actuating means will move said first friction pad into contact with said one rotor causing said reaction abutment means to move said housing and said radially extending leg to move said second friction pad into contact with said other one rotor and said first and second friction pads will move at least one of said rotors to effect friction contact between both of said rotors and said third friction pad.

2. The brake defined by claim 1 wherein said first, second and third friction pad means are non-rotatably supported by said housing.

3. The brake defined by claim 2 including a substantially rectangular opening through said housing radially outward from said rotors, said opening being defined by a plurality of edges including two circumferentially spaced, axially extending edges and said friction pad means are axially slidably supported by said axially extending edges.

* * * * *